United States Patent
Li

(10) Patent No.: US 10,766,390 B2
(45) Date of Patent: Sep. 8, 2020

(54) ARMREST BOX STRUCTURE AND VEHICLES HAVING THE SAME

(71) Applicants: Zhejiang Geely Holding Group Co., Ltd., Hangzhou, Zhejiang Province (CN); Zhejiang Geely Automobile Research Institute Co., Ltd., Taizhou, Zhejiang Province (CN)

(72) Inventor: Shufu Li, Hangzhou (CN)

(73) Assignees: ZHEJIANG GEELY HOLDING GROUP CO., LTD., Hangzhou, Zhejiang Province (CN); ZHEJIANG GEELY AUTOMOBILE RESEARCH INSTITUTE CO., LTD., Taizhou, Zhejiang Province (CN)

( * ) Notice: Subject to any disclaimer, the term of this patent is extended or adjusted under 35 U.S.C. 154(b) by 139 days.

(21) Appl. No.: 16/309,452

(22) PCT Filed: Mar. 29, 2017

(86) PCT No.: PCT/CN2017/078511
§ 371 (c)(1),
(2) Date: Dec. 12, 2018

(87) PCT Pub. No.: WO2017/215311
PCT Pub. Date: Dec. 21, 2017

(65) Prior Publication Data
US 2019/0248261 A1 Aug. 15, 2019

(30) Foreign Application Priority Data
Jun. 12, 2016 (CN) .......................... 2016 1 0409518

(51) Int. Cl.
*B60R 13/00* (2006.01)
*B60N 2/75* (2018.01)
*B60R 7/04* (2006.01)

(52) U.S. Cl.
CPC ............. *B60N 2/793* (2018.02); *B60N 2/773* (2018.02); *B60N 2/797* (2018.02); *B60R 7/04* (2013.01)

(58) Field of Classification Search
CPC .......... B60N 2/793; B60N 2/773; B60N 2/78; B60N 2/753; A47C 7/62; A47C 1/03; B60R 7/04
See application file for complete search history.

(56) References Cited

U.S. PATENT DOCUMENTS

| 5,979,987 A | * | 11/1999 | Rich | ...................... | B60N 2/793 |
| | | | | | 297/411.23 |
| 6,045,173 A | * | 4/2000 | Tiesler | ................... | B60N 3/102 |
| | | | | | 296/37.8 |

(Continued)

FOREIGN PATENT DOCUMENTS

| CN | 101830199 A | 9/2010 |
| CN | 202641540 U | 1/2013 |

(Continued)

*Primary Examiner* — Kiran B Patel
(74) *Attorney, Agent, or Firm* — Cheng-Ju Chiang

(57) ABSTRACT

An armrest box structure and a vehicle, the armrest box structure includes an armrest and an armrest box, the armrest is arranged on the armrest box, the armrest can slide backward relative to the armrest box, an armrest storage box is mounted at the backend of the upper surface of the armrest, and an armrest cover is set on the armrest storage box. When the armrest cover is open, an article area is confined on the armrest by the armrest storage box and the armrest cover, which is used for containing articles therein. By arranging the article area at the backend of the upper surface of the armrest, which is confined by the armrest storage box and the armrest cover, when the armrest cover is open, the article area can contain large-sized articles such as handbag, plastic bags etc.

20 Claims, 8 Drawing Sheets

(56) References Cited

U.S. PATENT DOCUMENTS

| | | | | |
|---|---|---|---|---|
| 6,419,314 B1* | 7/2002 | Scheerhorn | B60R 7/04 297/188.19 |
| 6,719,343 B2* | 4/2004 | Emerling | B60N 3/101 296/24.34 |
| 6,761,388 B2* | 7/2004 | Lein | B60N 3/002 296/24.34 |
| 6,851,736 B1* | 2/2005 | Klopp, III | B60R 7/04 224/926 |
| 7,029,048 B1* | 4/2006 | Hicks | B60N 3/101 296/193.04 |
| 7,147,259 B2* | 12/2006 | Radu | B60N 3/102 296/24.34 |
| 7,168,750 B2* | 1/2007 | Hutek | B60R 7/04 296/37.8 |
| 7,413,229 B2* | 8/2008 | Kukucka | B60N 3/101 296/24.34 |
| 7,416,235 B2* | 8/2008 | Rajappa | B60R 7/04 296/24.34 |
| 7,429,068 B2* | 9/2008 | Busha | B60N 3/101 296/24.34 |
| 7,431,365 B2* | 10/2008 | Sturt | B60N 2/793 296/24.34 |
| 7,455,016 B2* | 11/2008 | Perin | B43L 3/008 108/44 |
| 7,513,553 B2* | 4/2009 | Singh | B60N 3/08 296/37.8 |
| 7,604,291 B2* | 10/2009 | Vitito | B60R 11/0211 297/188.19 |
| 7,614,674 B2* | 11/2009 | Shiono | B60R 7/04 296/24.34 |
| 7,731,258 B2* | 6/2010 | Bazinski | B60N 2/793 296/37.8 |
| 7,770,954 B2* | 8/2010 | D'Alessandro | B60N 2/793 296/24.34 |
| 7,802,833 B2* | 9/2010 | Boreanaz | B60R 7/04 296/24.34 |
| 7,806,451 B2* | 10/2010 | Lota | B60R 7/04 296/24.34 |
| 7,931,322 B2* | 4/2011 | O'Brien | B60N 3/102 296/24.34 |
| 8,162,520 B2* | 4/2012 | Penner | B60N 3/101 362/154 |
| 8,167,348 B2* | 5/2012 | Fesenmyer | B60N 3/101 296/24.34 |
| 8,196,985 B2* | 6/2012 | Penner | B60R 7/04 296/24.34 |
| 8,210,592 B2* | 7/2012 | Spitler | B60R 7/04 296/24.34 |
| 8,235,442 B2* | 8/2012 | Spitler | B60R 7/04 296/24.34 |
| 8,448,483 B2* | 5/2013 | Brant | B60R 7/04 292/106 |
| 8,491,028 B2* | 7/2013 | Trivedi | B60N 2/793 296/24.34 |
| 8,528,956 B1* | 9/2013 | Winiger | B60R 7/04 296/24.34 |
| 8,939,491 B2* | 1/2015 | Gillis | B60N 3/101 296/24.34 |
| 9,018,904 B2* | 4/2015 | Seyerle | B60R 16/033 320/113 |
| 9,045,087 B2* | 6/2015 | Duenas | B60N 3/101 |
| 9,096,177 B2* | 8/2015 | Boundy | B60R 7/04 |
| 9,156,386 B2* | 10/2015 | Cinco | B60N 2/773 |
| 9,156,407 B1* | 10/2015 | Kramer | B60R 7/04 |
| 9,199,562 B2* | 12/2015 | Skapof | B60R 7/04 |
| 9,199,579 B2* | 12/2015 | Gillis | B60R 7/04 |
| 9,415,910 B2* | 8/2016 | Fukui | B60R 7/04 |
| 9,452,698 B2* | 9/2016 | Bohlke | B60N 2/876 |
| 9,561,753 B1* | 2/2017 | Mendoza Vera | B60R 7/04 |
| 9,868,401 B2* | 1/2018 | Kodama | B60R 7/04 |
| 9,925,896 B2* | 3/2018 | Dinant | B60N 2/77 |
| 10,040,397 B1* | 8/2018 | Wuerthele | B60R 7/04 |
| 10,066,425 B2* | 9/2018 | Saikawa | B60N 2/793 |
| 10,112,544 B2* | 10/2018 | Catlin | B60R 7/04 |
| 10,189,414 B1* | 1/2019 | Huebner | B60R 7/04 |
| 10,220,749 B2* | 3/2019 | Stiver | B60R 7/04 |
| 10,421,380 B2* | 9/2019 | Keenan | B60N 2/797 |
| 10,428,864 B2* | 10/2019 | Bozio | F16C 13/006 |
| 10,486,568 B2* | 11/2019 | Davis | B64D 11/0646 |
| 10,493,922 B2* | 12/2019 | Perez | B60R 11/0241 |
| 10,562,423 B2* | 2/2020 | Vander Sluis | B60N 2/773 |
| 2006/0108816 A1 | 5/2006 | Radu et al. | |
| 2009/0066103 A1* | 3/2009 | Koarai | B60R 7/04 296/24.34 |
| 2010/0050380 A1* | 3/2010 | Fujiwara | B60R 7/04 16/242 |
| 2013/0153447 A1* | 6/2013 | Cinco | B60N 2/793 206/216 |
| 2014/0138975 A1* | 5/2014 | Washio | B60R 7/04 296/24.34 |
| 2018/0236917 A1* | 8/2018 | Kim | B60N 2/78 |

FOREIGN PATENT DOCUMENTS

| | | |
|---|---|---|
| CN | 202863279 U | 4/2013 |
| CN | 203543816 U | 4/2014 |
| CN | 204527031 U | 8/2015 |
| CN | 104908655 A | 9/2015 |
| CN | 204774984 U | 11/2015 |
| CN | 105946729 A | 9/2016 |
| FR | 2901514 A1 | 11/2007 |
| GB | 2468565 A | 9/2010 |
| JP | S60-97650 U | 7/1985 |
| JP | H2-2253 U | 1/1990 |
| JP | H4-52946 U | 5/1992 |
| JP | H7-37812 U | 7/1995 |
| JP | H7-215133 A | 8/1995 |
| JP | 2000-159026 A | 6/2000 |
| JP | 2005-125836 A | 5/2005 |
| JP | 2007-55447 A | 3/2007 |
| JP | 2008-174027 A | 7/2008 |
| JP | 2009-107552 A | 5/2009 |
| JP | 2011-88620 A | 5/2011 |
| KR | 10-2004-0098364 A | 11/2004 |
| KR | 10-2005-0019690 A | 3/2005 |
| WO | 2006/086524 A2 | 8/2006 |
| WO | 2007/084316 A2 | 7/2007 |

* cited by examiner

US 10,766,390 B2

ARMREST BOX STRUCTURE AND VEHICLES HAVING THE SAME

CROSS REFERENCE TO RELATED APPLICATION

The present application is a 35 U.S.C. § 371 National Phase conversion of International (PCT) Patent Application No. PCT/CN2017/078511, filed on Mar. 29, 2017, which is based on and claims priority of Chinese patent application No. 201610409518.X, filed on Jun. 12, 2016. The entire disclosure of the above-identified application, including the specification, drawings and claims are incorporated herein by reference in its entirety. The PCT International Patent Application was filed and published in English.

FIELD OF THE INVENTION

The present disclosure relates to a vehicle technology field, in particular, relates to an armrest box structure and a vehicle having said armrest box structure.

BACKGROUND OF THE INVENTION

The armrest box of a vehicle is generally arranged behind the assistant dashboard, and located between two front seats. Such armrest box has two functions: providing a position for the drive or the co-driver to rest his/her arm, and providing a place to contain small items such as driving license, vehicle license etc. therein.

During driving practices in the long-run, there is still an inconvenient experience unsolved, i.e., if the driver carries a large-sized belonging such as a handbag, and the co-driver seat is occupied, the large-sized belonging such as the handbag would be normally deposited on the armrest. In this case, the large-sized belonging will affect the driver in the following aspects: first, it is inconvenient for his/her arm to rest on the armrest in the presence of the belonging thereon; second, when an emergency brake occurs, inertia will carry the handbag to the shift lever ahead of it, and this will bring potential safety hazard. If the handbag is deposited on the back seats, it is not convenient for the driver to fetch if needed, and he may be even inclined to be forgotten.

In view of the above, it is desirable to provide an armrest box structure which facilitates the driver to deposit large-sized articles.

SUMMARY OF THE INVENTION

The present disclosure provides an armrest box structure, which can solve the problem as described above, that is, large-sized articles deposited on the armrest box will affect driving and bring inconvenience for the driver to rest his/her arm.

One embodiment of the present disclosure provides an armrest box structure, which includes an armrest and an armrest box, the armrest is mounted on the armrest box, the armrest can slide backward relative to the armrest box, an armrest storage box is mounted at the backend of the upper surface of the armrest, and an armrest cover is set on the armrest storage box, which can be open and closed, when the armrest cover is open, an article area is confined on the armrest by the armrest storage box and the armrest cover, which is used for containing articles therein.

In one embodiment, the armrest cover is hinged at one sidewall of the armrest, the armrest cover can be opened towards one side of the armrest and further expose the armrest storage box.

In another embodiment, the armrest cover is hinged with a back end plate of the armrest, the armrest cover can be opened towards the back end of the armrest to expose the armrest storage box.

In one embodiment, when the armrest cover is opened, it is fixed at its opening position and provides a support for one side of the article deposited therein to lean against.

In one embodiment, a positioning combination of a cylinder and a recess is mounted between the armrest cover and the armrest, which makes the armrest cover fixed at the open position relative to the armrest.

In one embodiment, when the armrest cover is open, it has a tendency to close and provides a press to one side of the articled deposited therein.

In one embodiment, an elastic component is mounted between the armrest cover and the armrest, one end of the elastic component connects with the armrest, and the other end of the elastic component connects with the armrest cover, elastic resilience of the elastic component endows the armrest cover a tendency to close when it is open.

In one embodiment, the armrest cover includes a first armrest cover and a second armrest cover, both armrest covers are separately hinged with two sidewalls of the armrest, both armrest covers can be separately opened towards two opposite sides of the armrest to expose the armrest storage box.

In one embodiment, when opened, said both armrest covers provide support to the bottom or sides of the article deposited therein.

In one embodiment, said both armrest covers are sloping when opened, and said both armrest covers together with the armrest storage box form a storage space which gradually decreases from top to bottom.

In one embodiment, an elastic component is arranged between each armrest cover and the armrest, one end of the elastic component connects with the armrest, the other end of the elastic component connects with the corresponding armrest cover, the elastic resilience of the elastic component endows said both armrest covers a tendency to close when they are open.

In one embodiment, an armrest box cover is mounted on the armrest box, and the armrest is arranged on the armrest box cover, and a guide rail is sandwiched between the bottom surface of the armrest and the upper surface of the armrest box cover, which leads the armrest and the armrest box to connect with each other in a sliding mode.

In one embodiment, an armrest box storage tank is mounted in the armrest box, the armrest box cover is arranged over the armrest box storage tank, and the backend of the armrest box cover is hinged with the armrest box.

In one embodiment, a spacing hole is arranged in the bottom surface of the armrest, a switch slot is mounted in the armrest box cover, and a bar linkage is set in the switch slot, one end of the bar linkage connects with an elastic switch, and the other end of the bar linkage connects with a limit block, the elastic switch and the limit block have an elastic tendency to extend out of the upper surface of the armrest box cover.

In another embodiment, a receiving groove is mounted in forepart of the bottom surface of the armrest, and an auxiliary armrest is arranged in the receiving groove, the bottom surface of the auxiliary armrest is arranged over the armrest box cover with the support of an elastic component, the auxiliary armrest has a tendency to bounce up under the action of the elastic component.

In one embodiment, an arc-shaped slot is arranged at the backend of the auxiliary armrest, when the armrest slides backward and the auxiliary armrest bounces up, the front end of the armrest leans against the arc-shaped slot of the auxiliary armrest.

In one embodiment, when the armrest slides backward relative to the armrest box, the armrest has an elastic tendency to slide forward.

In one embodiment, the armrest is driven to slide relative to the armrest box by a drive motor, and a drive key is arranged on the armrest box, which is used to control the running of the drive motor.

In one embodiment, when the armrest cover is closed, the armrest cover and the front part of the upper surface of the armrest combine into one.

Another embodiment of the present disclosure also provides a vehicle, including the above mentioned armrest box structures.

The armrest box structure and the vehicle provided by the embodiments of the present disclosure have the following technical effects: by arranging the article area at the backend of the upper surface of the armrest, which is confined by the armrest storage box and the armrest cover, when the armrest cover is open, the article area can contain large-sized articles such as handbag, plastic bags etc. Further, the armrest can slide backward, it is convenient for the driver to deposit large-sized articles therein and rest his/her arm thereon. Meanwhile, the arrangement will not affect driving or the travel experience of the passenger in the back seats.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Embodiment 1

Figure 1:
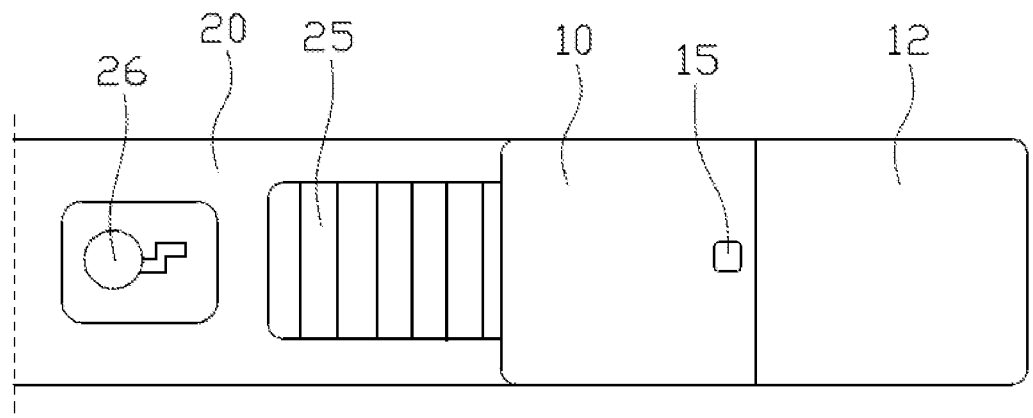
FIG. 1 is a top view of the armrest box structure in embodiment 1 of the present disclosure.
Figure 2:
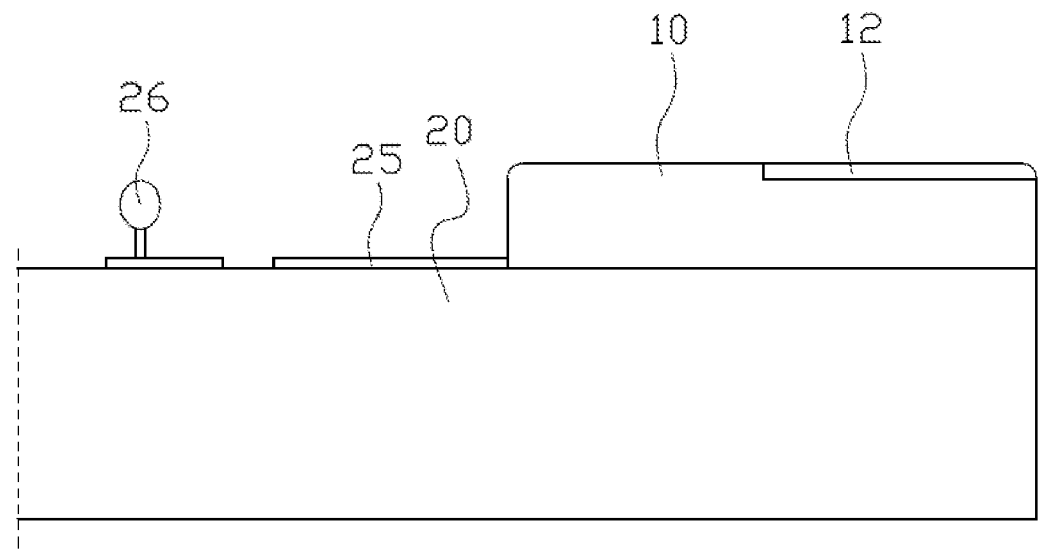
FIG. 2 is a side view of the armrest box structure in FIG. 1.
Figure 3:
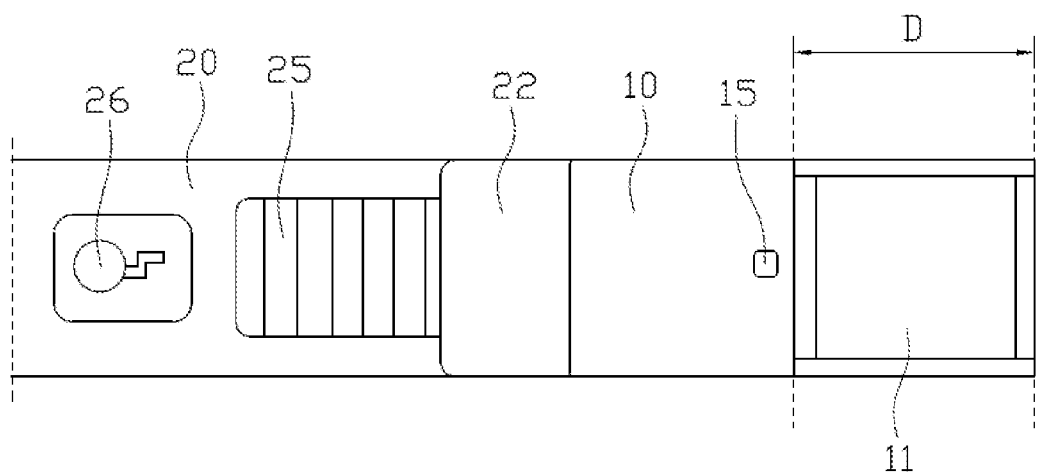
FIG. 3 is a top view of the armrest box structure in FIG. 1 after the armrest slides backwards.
Figure 4:
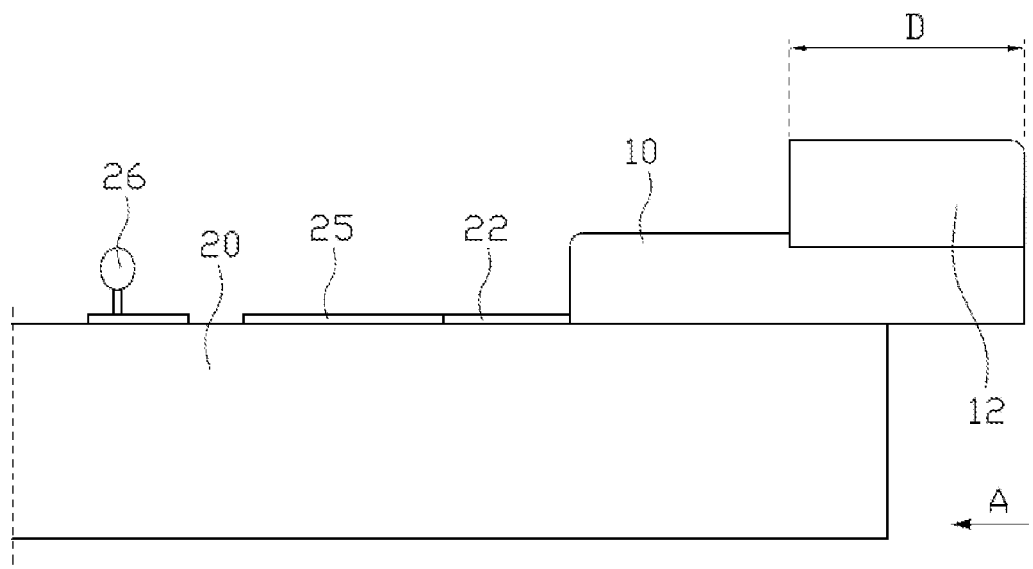
FIG. 4 is a side view of the armrest box structure in FIG. 3.
Figure 5:
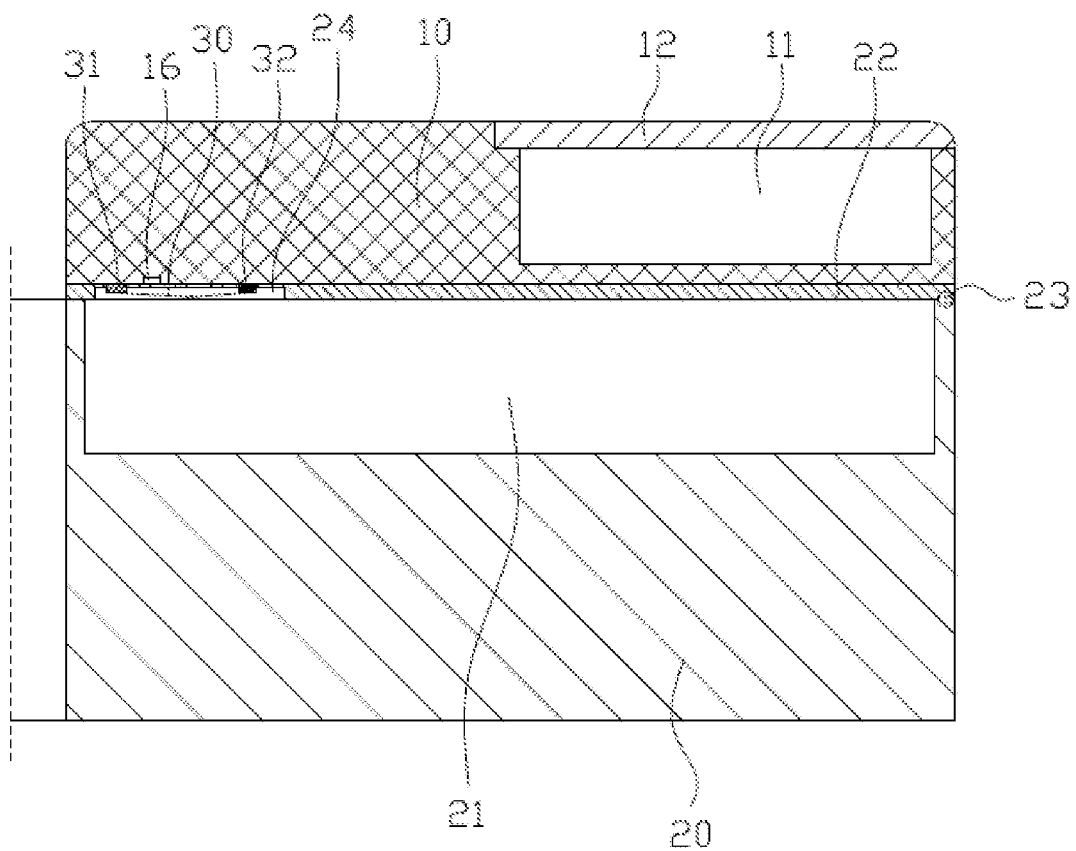
FIG. 5 is a partially cross-sectional view of the armrest box structure in FIG. 1 along longitudinal direction.
Figure 6:
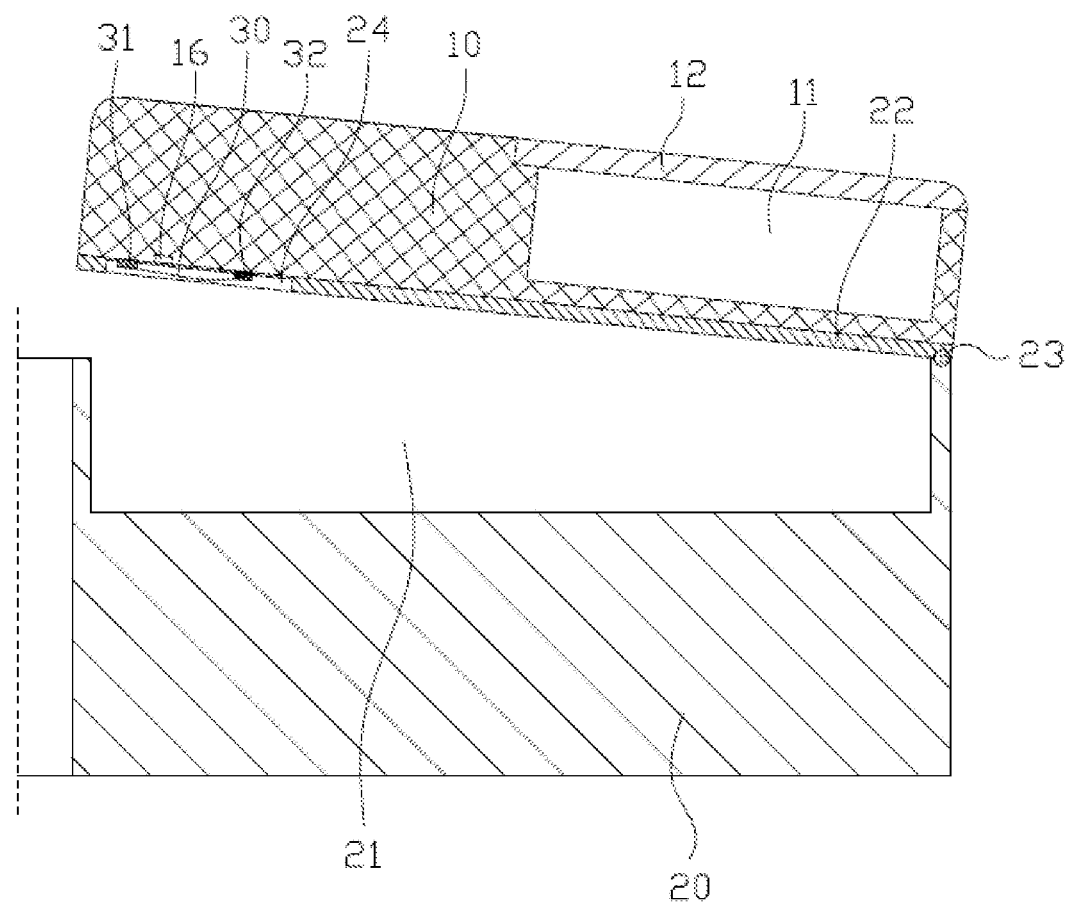
FIG. 6 is a schematic view of the armrest box structure in FIG. 5 when opening the armrest box cover.
Figure 7:
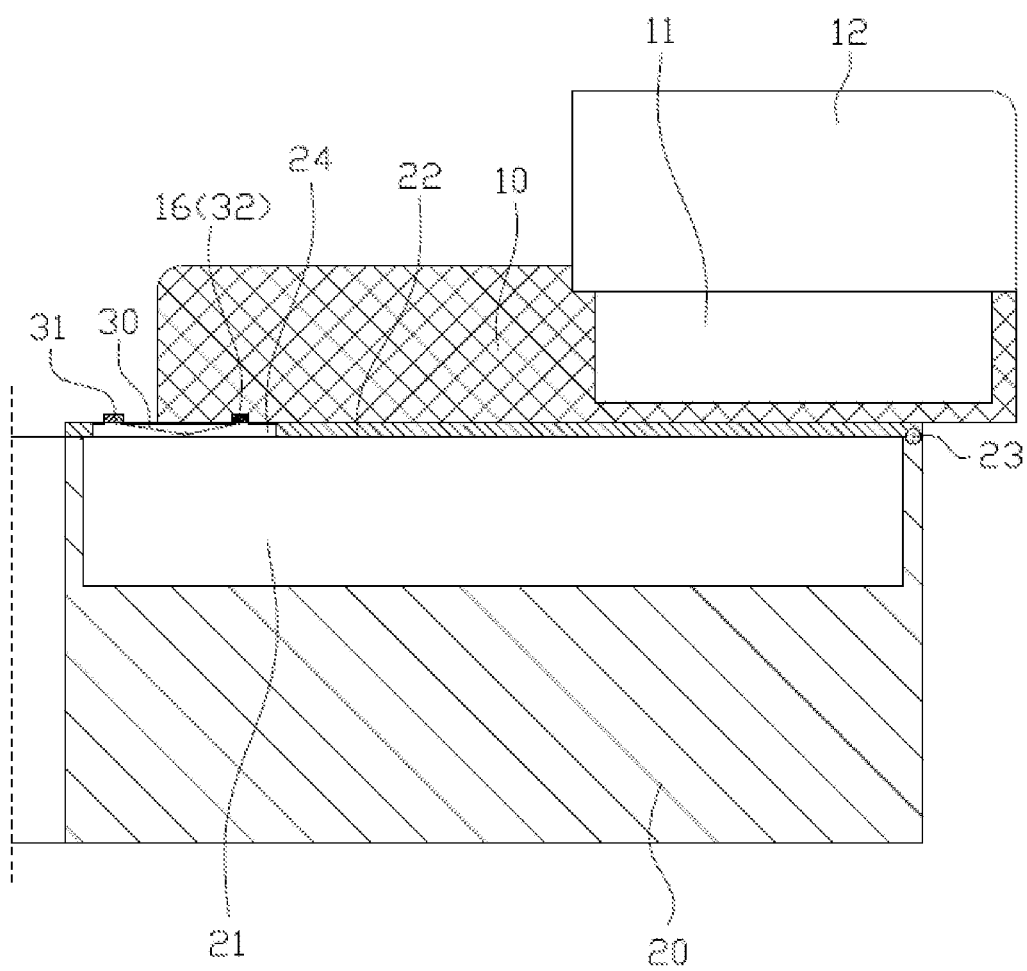
FIG. 7 is a partially cross-sectional view of the armrest box structure in FIG. 3 along longitudinal direction.

Please referring to FIGS. 1 to 7, an armrest box structure in embodiment 1 of the present disclosure includes an armrest 10 and an armrest box 20, the armrest 10 is arranged on the armrest box 20, and the armrest 10 can slide backward relative to the armrest box 20. Original position of the armrest 10 on the armrest box 20 is shown in FIGS. 1, 2 and 5, and the position after the armrest 10 slides backward relative to the armrest box 20 is shown in FIGS. 3, 4 and 7.

As shown in FIGS. 3 and 4, an armrest storage box 11 is disposed at a backend of an upper portion of the armrest 10, and an armrest cover 12 is set above the armrest storage box 11, which can be open and shut. When the armrest cover 12 is open, an article area D is confined on the armrest 10 by the armrest storage box 11 and the armrest cover 12 together, which can be used for containing large-sized articles therein such as handbag, plastic bags etc. Since the middle of the back seats is seldom seated, even it is seated, the legs of the passenger seated there is much below than that of the armrest 10, which will not affect the backward slide of the armrest 10. Therefore, if the article area D is arranged at the backend of the armrest 10 and the armrest 10 slides backward, it is more convenient for the driver to deposit large-sized articles at the article area D, and rest his/her arm at the front of the armrest 10. In this way, the arrangement of the armrest 10 and the article area D will neither affect driving nor affect the travel experience of the passenger in the back seats.

By arranging the armrest storage box 11 in the armrest 10, when depositing articles at the article area D, the bottom of the deposited article can at least partially insert into the armrest storage box 11, which can help fix the article and avoid shaking or shift; further, by arranging an armrest cover 12 on the armrest storage box 11, when under open state, the armrest cover 12 can provide a surface for the article to lean against and therefore makes the article to be deposited in the article area D more stably.

Figure 8A:
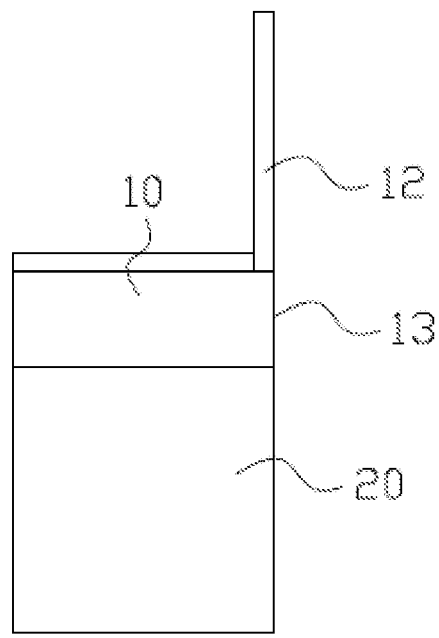
FIGS. 8a-8c are various schematic views of the armrest box structure in FIG. 3 along A direction.

In this embodiment, as shown in FIG. 8a, the armrest cover 12 is hinged at one sidewall 13 of the armrest 10 to facilitate the armrest cover 12 to open towards one side of the armrest 10 and further make the armrest storage box 11 exposed, and the opened armrest cover 12 and the armrest storage box 11 together provide support for the article.

As shown in FIG. 8a, in one embodiment, when the armrest cover 12 is open, it is fixed at the open position and stays vertically, therefore providing a surface for the article to lean against. For example, a positioning combination of a cylinder and a recess can be mounted between the armrest cover 12 and the armrest 10, which can make the armrest cover 12 fixed at the open position relative to the armrest 10. Since the position of the armrest cover 12 is fixed when it is open, the opened armrest cover 12 can provide a support for the deposited articles and improve its stability on the armrest 10. When the article is removed away, and the positioning function of the cylinder and recess is released between the armrest cover 12 and the armrest 10, the armrest cover 12 can be closed.

Figure 8B:
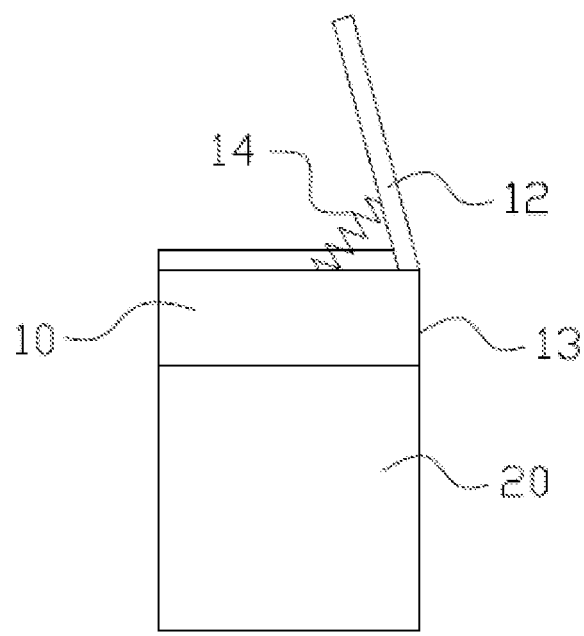

As shown in FIG. 8b, in another embodiment, when the armrest cover 12 is open, it has a tendency to close and provides a press to one side of the article deposited therein.

For example, an elastic component such as spring 14 can be mounted between the armrest cover 12 and the armrest 10, one end of the spring 14 connects with the armrest 10, and the other end of the spring 14 connects with the armrest cover 12. Elastic resilience of the spring 14 endows the armrest cover 12 a tendency to close when it is open, along this line, the armrest cover 12 which has the tendency to close provides a press to one side of the article deposited therein, and improves the stability of the article on the armrest 10. When the article is taken away, the armrest cover 12 will be automatically closed under the action of the spring 14.

Figure 8C:
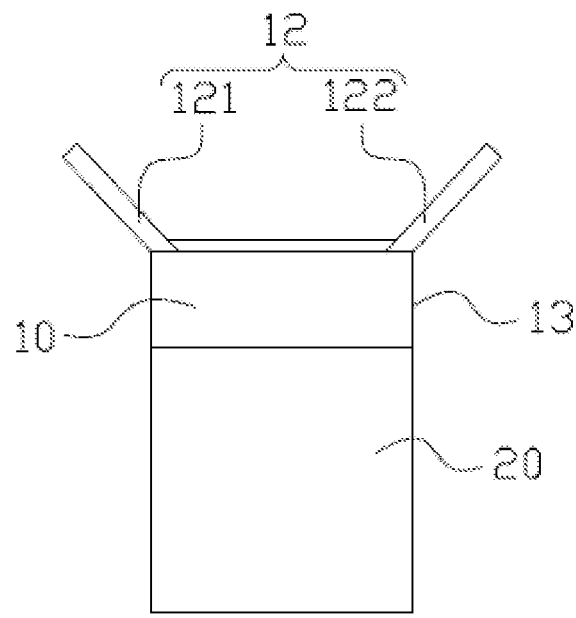

As shown in FIG. 8c, in yet another embodiment, the armrest cover 12 includes a first armrest cover 121 and a second armrest cover 122, both armrest covers 121, 122 are separately hinged at two sidewalls 13 of the armrest 10, and therefore both armrest covers 121, 122 can be separately opened towards two opposite sides of the armrest 10 to expose the armrest storage box 11. When depositing article at the article area D, when opened, said both armrest covers 121, 122 provide larger areas of support to the bottom or two opposite sides of the article, and therefore its stability on the armrest 10 is improved. In one embodiment, the open angle of said both armrest covers 121, 122 is respectively greater than 90 degrees and less than 180 degrees. For example, when the open angle θ is 135 degrees, said both armrest covers 121, 122 are sloping when they are open, together with the armest storage box 11, said both sloping armrest covers 121, 122 form a storage space gradually decreasing from top to bottom, which can provide certain clamping force to the article deposited therein. Further, when both armrest covers 121, 122 are open, the tendency to close will provide a press to two opposite sides of the article deposited in the storage space. For example, an elastic component such as a spring 14 is arranged between each armrest cover 121/122 and armrest 10, one end of the spring 14 connects with the armrest 10, the other end of the spring 14 connects with corresponding armrest cover 121/122, the elastic resilience of the spring 14 endows said both armrest covers 121, 122 a tendency to close when they are open, and the two armrest covers 121, 122 which has the tendency to close will provide certain press to the sides of the article deposited therein, and further improves its stability in the armrest 10.

Besides, when there is no need to deposit articles in the article area D, close the armrest cover 12, as shown in FIGS. 1 and 2, wherein the closed armrest cover 12 and a front part of the upper portion of the armrest 10 are connected into one body to provide a place to rest arm, similar as current armrest does.

In this embodiment, a cover switch 15 is mounted in the armrest 10, as shown in FIG. 1, which is used to control the armrest cover 12 to open and close. The cover switch 15 can be arranged at the upper surface of the armrest 10 or at other places. The cover switch 15 can be designed as various forms, and the method to control the armrest cover 12 open can also be various, which will not be described in detail here.

In this embodiment, please referring to FIGS. 5-7, an armrest box cover 22 is mounted on the armrest box 20, and the armrest 10 is arranged on the armrest box cover 22, and a guide rail (not shown) is sandwiched between a bottom surface of the armrest 10 and an upper surface of the armrest box cover 22, which leads the armrest 10 and the armrest box 20 to connect with each other in a sliding mode. When the armrest 10 slides backward relative to the armrest box 20, it has an elastic tendency to slide forward and has a certain damping to enable the armrest 10 to automatically slide back when necessary. Further, an armrest box storage tank 21 is disposed in the armrest box 20, the armrest box cover 22 is arranged over the armrest box storage tank 21, and the back of the armrest box cover 22 is hinged with the armrest box 20 via a hinge 23 to make the armrest box cover 22 open from anterior to posterior, as shown in FIG. 6, which facilitates the driver to put/take small items such as a charger, tickets to/from the armrest box storage tank 21.

In another embodiment, as shown in FIGS. 5-7, a spacing hole 16 is arranged in the bottom surface of the armrest 10, a switch slot 24 is mounted in the armrest box cover 22, and a bar linkage 30 is set in the switch slot 24. One end of the bar linkage 30 connects with an elastic switch 31, and the other end of the bar linkage 30 connects with a limit block 32, the elastic switch 31 and the limit block 32 have an elastic tendency extending out of the upper surface of the armrest box cover 22. When the driver wants to deposit large-sized articles on the armrest 10, press the cover switch 15, open the armrest cover 12, and deposit the article into the armrest storage box 11. Under the support of the armrest cover 12, the article is stably deposited in the armrest storage box 11. And then, along with the armrest 10 sliding backward, the spacing hole 16 in the armrest 10 aligns with the limit block 32 on the armrest box 20, and the limit block 32 is clipped into the spacing hole 16, the armrest 10 is finally limited at predetermined position. At this circumstance, the elastic switch 31 bounces up and protrudes out of the upper surface of the armrest box cover 22 under the action of the bar linkage 30. When the armrest 10 needs to be returned, press the elastic switch 31 downwards, the bar linkage 30 leads the limit block 32 to move down and leave away from the spacing hole 16. Since the armrest 10 has an elastic tendency to slide forward and has damping, the armrest 10 will automatically slide forward to its original position, when the driver can take his articles from the armrest 10 and close the armrest cover 12, or the armrest cover 12 is automatically closed.

In one embodiment, as shown in FIGS. 1-4, an armrest box container 25 is further mounted on the armrest box 20, straightly ahead of the armrest 10, which is used to deposit items such as a cup, or a drink bottle etc. The armrest box container 25 can be open-type structure or louvered structure. Besides, a shift lever 26 is located in front of the armrest box container 25.

Embodiment 2

Figure 9:
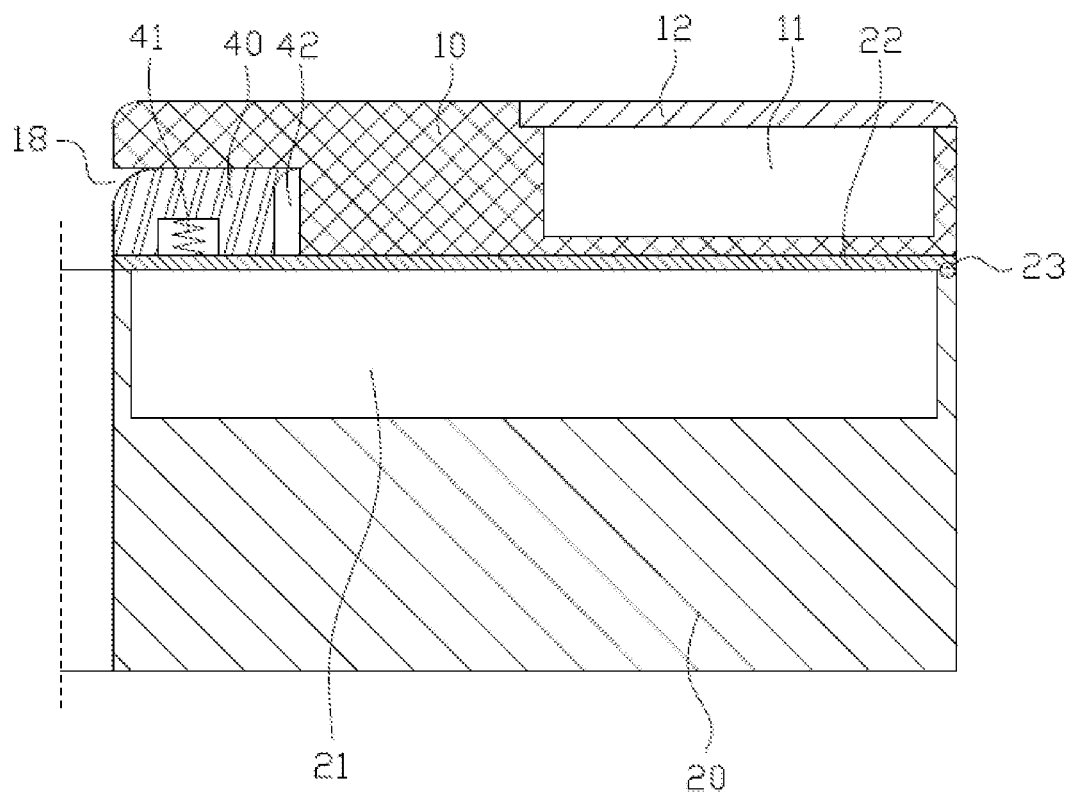
FIG. 9 is a partially cross-sectional view of the armrest box structure in embodiment 2 of the present disclosure.
Figure 10:
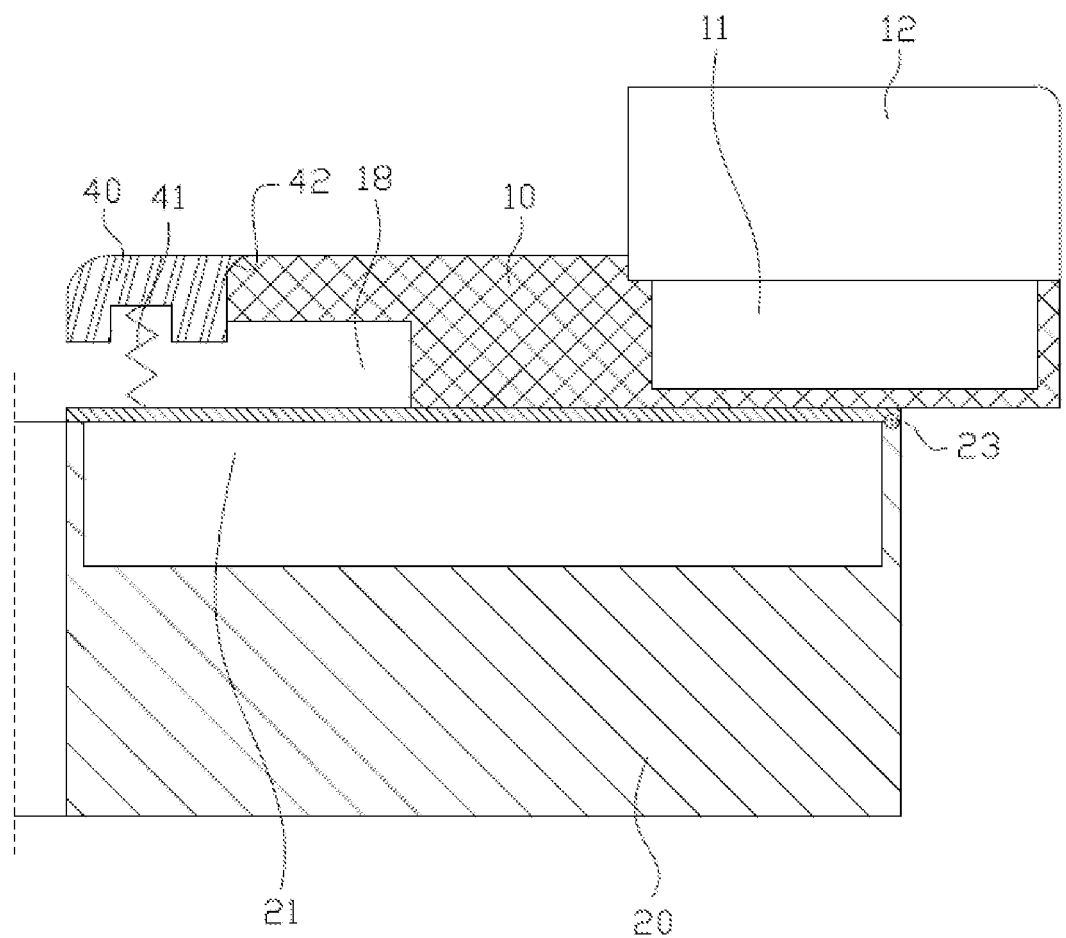
FIG. 10 is a cross-sectional view of the armrest box structure in FIG. 9 when the armrest slides backwards.

Please referring to FIGS. 9-10, the armrest box in embodiment 2 of the present disclosure is basically the same as that in the above-mentioned embodiment 1, wherein the difference lies in that: in embodiment 2, a receiving groove 18 is mounted in forepart of the bottom surface of the armrest 10, and an auxiliary armrest 40 is arranged in the receiving groove 18. Further, the bottom surface of the auxiliary armrest 40 is arranged over the armrest box cover 22 under the support of an elastic component 41 such as a spring, because of this, the auxiliary armrest 40 has a tendency to bounce up under the action of the elastic component 41. When large-sized article is to be deposited on the armrest 10, the driver will first press the cover switch 15, open the armrest cover 12, and put his article into the armrest storage box 11, in this way, the article is stably deposited in the armrest storage box 11 with the assist of the armrest cover 12. Next, slide the armrest 10 backward, when the armrest 10 reaches its predetermined position, the auxiliary armrest 40 breaks away from the receiving groove 18 and automatically bounces up to combine with the armrest 10 to form a new larger armrest device. Because of this, the auxiliary armrest 40 not only extends the length of the armrest 10, which makes the driver more comfortable, but it also acts as a position limitation function to the armrest 10 and limits the armrest 10 at a fixed position. Just because of this, the above-mentioned position limiting stop structure such as the spacing hole 16, the switch slot 24 and the bar linkage 30 etc. of embodiment 1 is omitted in embodiment 2. Instead, the auxiliary armrest 40 provides position limitation function to avoid the armrest 10 to slide forward when braking. When the armrest 10 needs to return to its original position, just press the auxiliary armrest 40 downwards, and the armrest 10 will automatically slide forward to its original position under the action of its elastic tendency.

Further, an arc-shaped slot 42 is arranged at a backend of the auxiliary armrest 40, when the armrest 10 slides backward and the auxiliary armrest 40 bounces up, a front end of the armrest 10 is received in the arc-shaped slot and leans against the auxiliary armrest 40. The arrangement above can make the combination between the auxiliary armrest 40 and the armrest 10 more tightly. Meanwhile, the armrest 10 can provide certain support to the auxiliary armrest 40. Due to the existence of the arc-shaped slot 42, when pressing the auxiliary armrest 40, the pressure applied onto the auxiliary armrest 40 needs to be greater. Because of this, when resting arm on the auxiliary armrest 40, it is not easy for the armrest 10 to automatically return to its original position by a slight pressure onto the auxiliary armrest 40 by chance.

Embodiment 3

Figure 11:
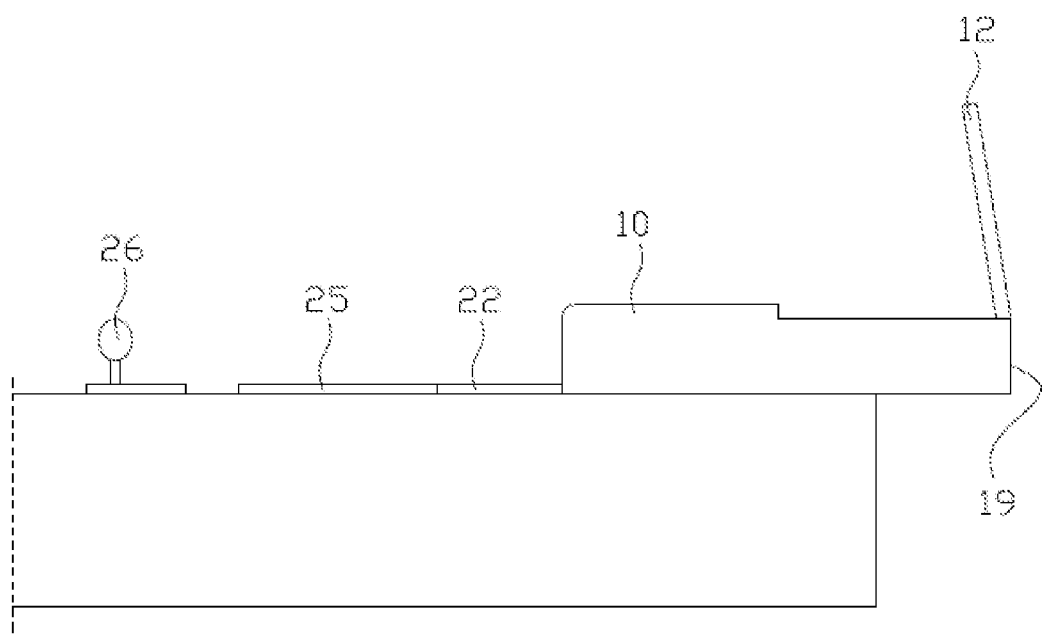
FIG. 11 is a side view of the armrest box structure in embodiment 3 of the present disclosure.

Please referring to FIG. 11, the armrest box in embodiment 3 of the present disclosure is essentially the same as that in the above mentioned embodiments 1 and 2, wherein the difference lies in that: in embodiment 3, the armrest cover 12 is hinged with a back end plate 19 of the armrest 10, in this way, the armrest cover 12 can be opened towards the back end of the armrest 10 to expose the armrest storage box 11. The opened armrest cover 12 together with the armrest storage box 11 can hold and fix the article deposited therein. For example, when the armrest cover 12 is opened, it can be fixed at its opening position and provide a support for one side of the article deposited therein to lean against it, as shown in FIG. 8a. In another example, when the armrest cover 12 is opened, it has a tendency to close and provide a press to the article deposited therein, as shown in FIG. 8b. Such schemes will not be described in detail herein.

Embodiment 4

Figure 12:
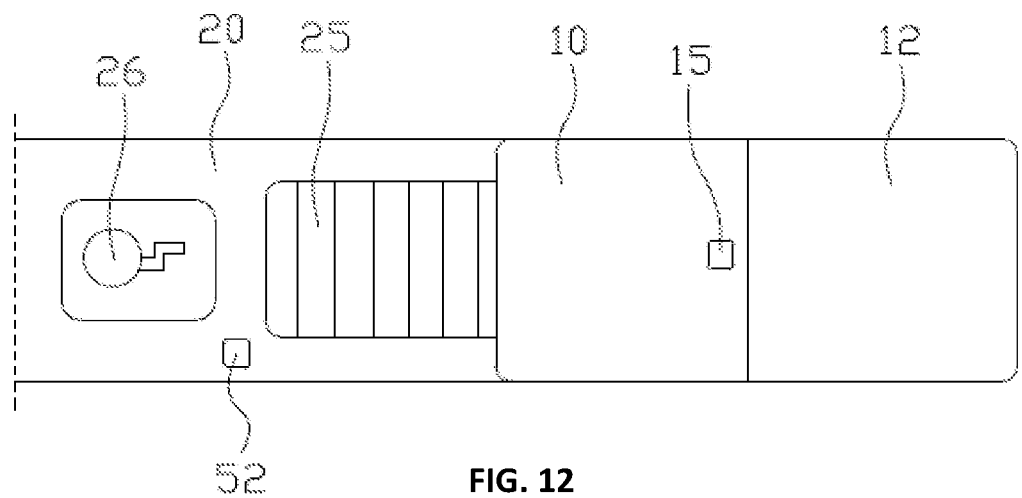
FIG. 12 is a top view of the armrest box structure in embodiment 4 of the present disclosure.
Figure 13:
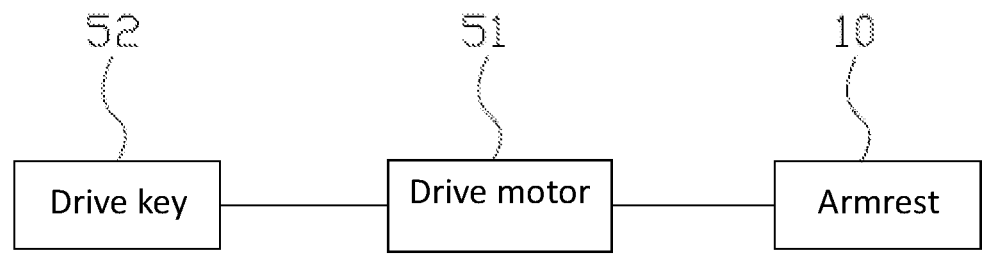
FIG. 13 is a schematic diagram of the drive mechanism in the armrest box structure in FIG. 12 which is used to drive the armrest.

Please referring to FIGS. 12-13, the armrest box in embodiment 4 of the present disclosure is basically the same as that in the above-mentioned embodiments 1-3, wherein the main difference lies in that: in embodiment 4, the armrest 10 is electrically driven to slide relative to the armrest box 20, and the electrical driven module is preferably applying a stepless drive motor 51 such as a step-motor, which can drive the armrest 10 to stay at anywhere on the armrest box 20. Along this line, the position of the armrest 10 can be adjusted according to the size of the articles. In this embodiment, a drive key 52 is arranged on the armrest box 20, which is used to control the running of the drive motor 51. When toggling the drive key 52 backwards, the drive motor 51 will drive the armrest 10 to slide backwards until the armrest 10 reaches the desired position, and then stop toggling drive key 52. When toggling the drive key 52 forward, the drive motor 51 will drive the armrest 10 to slide forward towards its original position until the armrest 10 reaches its original position, and then stop toggling drive key 52.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An armrest box structure, comprising an armrest and an armrest box, the armrest being arranged on the armrest box, wherein the armrest can slide backward relative to the armrest box, an armrest storage box is disposed at a backend of an upper portion of the armrest, and an armrest cover, which can be open and closed, is set above the armrest storage box, when the armrest cover is open, an article area is formed on the armrest between the armrest storage box and the armrest cover for containing articles therein.

2. The armrest box structure of claim 1, wherein the armrest cover is hinged at one sidewall of the armrest, the armrest cover can be opened towards one side of the armrest and further expose the armrest storage box.

3. The armrest box structure of claim 1, wherein the armrest cover is hinged on a back end plate of the armrest, the armrest cover can be open towards the back end of the armrest to expose the armrest storage box.

4. The armrest box structure of claim 2, wherein when the armrest cover is open, the armrest cover is fixed at an open position where the armrest cover provides an abutment support for one side of the article deposited in the article area.

5. The armrest box structure of claim 4, wherein a cylinder and a recess is mounted between the armrest cover and the armrest, through positioning by the cylinder and the recess, the armrest cover is fixed at the open position.

6. The armrest box structure of claim 2, wherein when the armrest cover is open, it has a tendency to close and provides a press to one side of the article deposited in the article area.

7. The armrest box structure of claim 6, wherein an elastic component is mounted between the armrest cover and the armrest, one end of the elastic component connects with the armrest, and the other end of the elastic component connects with the armrest cover, when the armrest cover is open, an elastic resilience of the elastic component endows the armrest cover a tendency to close.

8. The armrest box structure of claim 1, wherein the armrest cover comprises a first armrest cover and a second armrest cover, the first armrest cover and the second armrest cover are separately hinged with two sidewalls of the armrest, and the first armrest cover and the second armrest cover can be separately opened towards two sides of the armrest to expose the armrest storage box.

9. The armrest box structure of claim 8, wherein when the first armrest cover and the second armrest cover are open, the first armrest cover and the second armrest cover provide a support to a bottom or two opposite sides of the article deposited the armrest storage box.

10. The armrest box structure of claim 8, wherein the first and the second armrest covers are sloping when they are open, and together with the armrest storage box, the first and the second armrest covers form a storage space which gradually decreases from top to bottom.

11. The armrest box structure of claim 8, wherein an elastic component is arranged between each armrest cover and the armrest, one end of the elastic component connects with the armrest, the other end of the elastic component connects with the corresponding armrest cover, elastic resilience of the elastic component endows said both armrest covers a tendency to close when they are open.

12. The armrest box structure of claim 1, wherein an armrest box cover is mounted on the armrest box, and the armrest is arranged on the armrest box cover, and a guide rail is sandwiched between a bottom surface of the armrest and an upper surface of the armrest box cover, the armrest and the armrest box are connected with each other in a sliding mode through the guide rail.

13. The armrest box structure of claim 12, wherein an armrest box storage tank is disposed in the armrest box, the armrest box cover is arranged over the armrest box storage tank, and a backend of the armrest box cover is hinged with the armrest box.

14. The armrest box structure of claim 12, wherein a spacing hole is arranged in the bottom surface of the armrest, a switch slot is mounted in the armrest box cover, and a bar linkage is set in the switch slot, one end of the bar linkage connects to an elastic switch, and the other end of the bar linkage connects to a limit block, the elastic switch and the limit block have an elastic tendency to extend out of the upper surface of the armrest box cover.

15. The armrest box structure of claim 1, wherein a receiving groove is mounted in forepart of a bottom portion of the armrest, and an auxiliary armrest is arranged in the receiving groove, a bottom surface of the auxiliary armrest is arranged on the armrest box cover with the support of an elastic component, the auxiliary armrest has a tendency to bounce up under the action of the elastic component.

16. The armrest box structure of claim 15, wherein an arc-shaped slot is arranged at a backend of the auxiliary armrest, when the armrest slides backward and the auxiliary armrest bounces up, a front end of the armrest is received in the arc-shaped slot and leans against the auxiliary armrest.

17. The armrest box structure of claim 1, wherein when the armrest slides backward relative to the armrest box, the armrest has an elastic tendency to slide forward.

18. The armrest box structure of claim 1, wherein the armrest is driven to slide relative to the armrest box by a drive motor, and a drive key is arranged on the armrest box, which is used to control the running of the drive motor.

19. The armrest box structure of claim 1, wherein when the armrest cover is closed, the armrest cover and a front part of the upper portion of the armrest are connected into one body.

20. A vehicle, wherein it comprises the armrest box structure as described in claim 1.

* * * * *